United States Patent
Blumentritt

(10) Patent No.: US 11,863,345 B2
(45) Date of Patent: Jan. 2, 2024

(54) METHODS AND COMPUTER PROGRAMS FOR MONITORING COMMUNICATION COMPONENTS IN AN EVENT-BASED MANNER VIA A DATA BUS

(71) Applicant: Volkswagen Aktiengesellschaft, Wolfsburg (DE)

(72) Inventor: Marc Blumentritt, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 119 days.

(21) Appl. No.: 16/961,883

(22) PCT Filed: Jan. 14, 2019

(86) PCT No.: PCT/EP2019/050834
§ 371 (c)(1),
(2) Date: Jul. 13, 2020

(87) PCT Pub. No.: WO2019/141632
PCT Pub. Date: Jul. 25, 2019

(65) Prior Publication Data
US 2020/0366521 A1 Nov. 19, 2020

(30) Foreign Application Priority Data
Jan. 18, 2018 (DE) .......................... 102018101103.2

(51) Int. Cl.
*H04L 12/40* (2006.01)
*G06F 11/07* (2006.01)
(Continued)

(52) U.S. Cl.
CPC .... *H04L 12/40032* (2013.01); *G06F 11/0739* (2013.01); *G06F 11/0751* (2013.01); *G06F 11/0772* (2013.01); *H04L 2012/40273* (2013.01)

(58) Field of Classification Search
CPC ... H04L 12/40; H04L 12/40; H04L 12/40002; H04L 12/40003; H04L 2012/40273;
(Continued)

(56) References Cited

U.S. PATENT DOCUMENTS 4,545,077 A * 10/1985 Drapala ............ H04L 12/40013
398/60
5,357,518 A * 10/1994 Peter ................... G06F 11/1608
714/E11.054

(Continued)

FOREIGN PATENT DOCUMENTS

EP 2144400 A1 1/2010

OTHER PUBLICATIONS

Silva L M et al.: "DIP: Distributed Diagnosis Protocol"; Microprocessing and Microprogramming, Elsevier Science Publishers, BV., Amsterdam, NL, vol. 38, No. 1-5, Sep. 1, 1993, pp. 171-178.

*Primary Examiner* — Jenee Holland
(74) *Attorney, Agent, or Firm* — 2SPL Patentanwälte PartG mbB; Kieran O'Leary

(57) ABSTRACT

Embodiments create methods and computer programs for a monitoring entity and a communication component, a monitoring entity, a communication component, a system and a vehicle. The method (10) for a monitoring entity (30) for monitoring at least one communication component (40), wherein the communication component (40) is configured to communicate with one or more other communication components (50) in an event-based manner via a data bus (70), comprises regularly checking (12) the function of the communication component (40) using the monitoring entity. The method further includes cyclically communicating (14) with at least one other monitoring entity (60) assigned to another communication component (50) in order to monitor the function of the communication component (30), the function
(Continued)

of the other communication component (50) and the function of the data bus (70).

18 Claims, 8 Drawing Sheets

(51) Int. Cl.
H04L 43/10 (2022.01)
H04L 43/0811 (2022.01)
H04L 43/0817 (2022.01)

(58) Field of Classification Search
CPC .. G06F 11/07; G06F 11/0703; G06F 11/0706; G06F 11/0736; G06F 11/0739; G06F 11/0751; G06F 11/0772; G06F 11/0766
See application file for complete search history.

(56) References Cited

U.S. PATENT DOCUMENTS

| | | | | |
|---|---|---|---|---|
| 5,479,395 | A * | 12/1995 | Goodman | H04L 12/40143 370/461 |
| 5,502,812 | A * | 3/1996 | Leyre | G06F 11/2038 714/10 |
| 6,574,197 | B1 | 6/2003 | Hiroo et al. | |
| 7,046,929 | B1 * | 5/2006 | Hester | H04B 10/0771 398/1 |
| 8,239,523 | B1 * | 8/2012 | Black | G06F 11/0748 709/224 |
| 9,586,693 | B1 * | 3/2017 | Heinrich | B64D 45/00 |
| 2001/0039577 | A1 * | 11/2001 | Barkai | H04L 41/042 709/223 |
| 2003/0037272 | A1 * | 2/2003 | Flaschka | H04L 12/42 713/340 |
| 2003/0056043 | A1 * | 3/2003 | Kostadinov | H04L 9/40 710/104 |
| 2003/0067873 | A1 * | 4/2003 | Fuhrmann | H04L 12/422 370/252 |
| 2003/0093727 | A1 * | 5/2003 | Belschner | H04L 12/44 714/56 |
| 2003/0115543 | A1 * | 6/2003 | Emde | H04L 1/242 714/800 |
| 2004/0100971 | A1 | 5/2004 | Wray | |
| 2005/0204214 | A1 * | 9/2005 | Welch | H04L 43/04 714/712 |
| 2006/0112315 | A1 * | 5/2006 | Pfeufer | H04L 12/40032 714/47.2 |
| 2007/0036095 | A1 * | 2/2007 | Fuhrmann | H04L 12/40013 370/282 |
| 2009/0043887 | A1 * | 2/2009 | Coekaerts | H04L 43/0817 709/224 |
| 2011/0060855 | A1 * | 3/2011 | Kuschke | H04L 12/4625 710/316 |
| 2013/0024721 | A1 * | 1/2013 | Kabulepa | G06F 11/165 714/E11.023 |
| 2014/0058541 | A1 * | 2/2014 | Goepfert | G06F 11/0739 700/79 |
| 2014/0211637 | A1 * | 7/2014 | Sawal | H04L 41/06 370/244 |
| 2016/0163125 | A1 * | 6/2016 | Kim | G06F 11/3024 701/31.4 |
| 2016/0269225 | A1 * | 9/2016 | Kirchmeier | H04L 12/40 |
| 2017/0078213 | A1 * | 3/2017 | May | G06F 13/372 |
| 2022/0077982 | A1 * | 3/2022 | Zhang | H04L 5/0014 |

* cited by examiner

METHODS AND COMPUTER PROGRAMS FOR MONITORING COMMUNICATION COMPONENTS IN AN EVENT-BASED MANNER VIA A DATA BUS

CROSS-REFERENCE TO RELATED APPLICATIONS

This application is a 35 U.S.C. § 371 national stage entry of PCT Application PCT/EP2019/050834, filed on Jan. 14, 2019. That application claims priority to German Application No. 10 2018 101 103.2 filed on Jan. 18, 2018. The contents of the earlier filed applications are incorporated by reference herein in their entirety.

TECHNICAL FIELD

The present invention relates to methods and computer programs for a monitoring entity and a communication component, a monitoring entity, a communication component, a system and a vehicle, particularly, but not limited to a concept for monitoring communication components for event-based communication in a motor vehicle.

BACKGROUND

In automotive engineering, as well as computer or communication technology in general, data buses are used which allow data communication between different components that are connected or coupled to a data bus. Here, for example, two communication partners or communication components exchange messages via a data bus, wherein the communication is event-based. In contrast to cyclic communication, with event-based communication messages are only exchanged when an associated event occurs. For example, at a motor vehicle bus, a "switch turn signal on" message (also known as a "request") is sent when the driver activates the turn signal and, correspondingly, a "switch turn signal off" message is sent when the turn signal lever returns to its original position.

Malfunctions may cause either the communication partner or the communication link (e.g. interruption of the data bus) to fail. In this case, the question may arise as to how such a failure may be detected. With event-based communication there is no time-out monitoring, resulting in this failure not being noticed without further measures.

From the point of view of a communication partner, no difference may be detected between a failure or non-occurrence of the event, since in both cases no message is sent.

For a continuous target specification, a device requesting a service (also known as a "client") would renew its request before a maximum execution time expires. In the above example, the turn signal would be switched on for 10 seconds, for example, after receiving the switch-on message. However, if the turn signal lever was still activated after these 10 seconds, a new switch-on message would have to be sent to keep the turn signal active. If the turn signal lever is deactivated before the 10 seconds have elapsed, a switch-off message would have to be sent accordingly. While this mechanism would prevent the turn signal from remaining switched on indefinitely in the event of communication errors on the data bus, the error itself would not be detected.

For safety-relevant functions time-out times are typically less than one second.

In order to take this into account, the event-based communication described above would be converted into a quasi-cyclic communication in order to be able to adhere to the time-outs. Since this would affect a large number of functions in case of doubt, a high bus load would result, without resulting in any functional added value.

Examples of such so-called use cases are turn signals, warning lights, seat adjustment, lighting, ventilation, set-point specifications (e.g. cruise control), fan control, etc.

Thus, there is a demand for an improved concept for the detection of the above mentioned error patterns without all functions at application level needing to implement their own time-out monitoring mechanisms.

SUMMARY

This demand is met by methods and computer programs for a for a monitoring entity and a communication component, a monitoring entity, a communication component, a system and a vehicle according to the independent claims attached. Advantageous designs and further development are subject of the dependent claims.

Embodiments of the present invention are based on the core idea that monitoring entities may be used to control functions of communication components. The monitoring entities may communicate cyclically with each other and thus a failure of a communication component or a data bus may be detected. The cyclic control information exchanged between different monitoring entities may be reduced compared to the control information that would have to be exchanged directly between the communication components for monitoring purposes, especially if one monitoring entity monitors several communication components.

Embodiments create a method for a monitoring entity for monitoring at least one communication component, wherein the communication component is configured to communicate with one or more other communication components in an event-based manner via a data bus. The method includes regularly checking the function of the communication component through the monitoring entity and cyclically communicating with at least one other monitoring entity assigned to another communication component in order to monitor the function of the communication component, the function of the other communication component and the function of the data bus. The cyclic communication between the monitoring entities allows monitoring of the communication between the communication components and the data bus.

Embodiments create a method for a communication component to communicate with one or more other communication components via a data bus. The method includes event-based communication with the one or more other communication components via the data bus and cyclic communication with the monitoring entity. Embodiments may thus allow efficient monitoring of communication components.

In some embodiments, cyclic communication between monitoring entities takes place on the data bus, whereby the data bus may also be checked indirectly. A failure of the cyclic communication with intact monitoring entities allows the conclusion of a malfunction on the data bus. In further embodiments, the method may further include cyclic communication between the monitoring entity and the communication component via a connection that differs from the data bus, for example a local connection. The communication set up for direct monitoring is then independent of the data bus and its success does not depend on the transmission capacities and states of the data bus.

In some embodiments, the method may further include transmitting an error indication to at least one other monitoring entity, when a malfunction or a communication error of the communication component is detected. In this respect, the communication necessary for monitoring may be limited to the monitoring entities and thus be implemented efficiently. Furthermore, the method may also include synchronization with at least one other monitoring entity via the data bus. Efficiency of cyclic communication may be increased that way. In some embodiments, the communication component may be registered with the monitoring entity. Analogously, the method for the communication component may include registration with the monitoring entity. Thus, the monitoring entity and the method may be used more universally, for example for different and several communication components. Embodiments may, for example, be used to monitor communication components and a data bus in a vehicle.

Embodiments further create one or more computer programs for executing at least one of the methods described herein, when the computer program is executed on a computer, a processor, or a programmable hardware component.

A further embodiment is a monitoring entity for a communication component, which is configured to communicate with one or more other communication components via a data bus. The monitoring entity includes one or more interfaces for communication via the data bus and for communication with the communication component. The monitoring entity further includes a control unit, configured to control the one or more interfaces and to communicate cyclically with the communication component and with at least one other monitoring entity of another communication component. In some embodiments, the control unit may be configured to communicate with the communication component via a connection which differs from the data bus. Monitoring may thus be carried out independently of the data bus.

The control unit may be configured to transmit an error indication to at least one other monitoring entity, when a malfunction or a communication error of the communication component is detected. Malfunctions may thus be brought to the attention of other monitoring entities. In some embodiments the control unit may be configured to synchronize with at least one other monitoring entity via the data bus and/or to perform a registration of a communication component. The monitoring entity may be configured to monitor communication components and a data bus in a vehicle.

Embodiments also create a communication component to communicate with one or more other communication components via a data bus. The communication component includes one or more interfaces for communication via the data bus and for communication with a monitoring entity. The communication component further includes a control unit, configured to control the one or more interfaces, to communicate with the one or more other communication components in an event-based manner and to communicate cyclically with the monitoring entity. As described above, the control unit may be configured to carry out a registration with the monitoring entity.

Embodiments also provide a system with at least two monitoring entities as described above and at least two communication components associated with the monitoring entities according to the above description. A further embodiment is a vehicle with such a system.

BRIEF DESCRIPTION OF THE FIGURES

In the following, further advantageous embodiments are explained in more detail with reference to the embodiments illustrated in the drawings, to which embodiments are, however, not generally restricted, in which.

DETAILED DESCRIPTION

Various embodiments will now be described in detail with reference to the accompanying drawings in which some example embodiments are illustrated. Optional features or components are shown in dotted lines.

Although embodiments may be modified and altered in various ways, embodiments are illustrated as examples in the figures and are described in detail herein. However, it should be made clear that it is not the intention to limit embodiments to the respective forms disclosed, but rather that embodiments should cover all functional and/or structural modifications, equivalents and alternatives that lie within the scope of the invention.

It is noted, that an element which is referred to a being "connected" or "coupled" to another element, may be directly connected or coupled to the other element or that intervening elements may be present. If an element is referred to as being "directly connected" or "directly coupled" to another element, however, no intervening elements are present. Other terms used to describe a relationship between elements ought to be interpreted likewise (e.g. "between" versus "directly between", "adjacent" versus "directly adjacent", etc.).

The terminology used herein only serves the description of specific embodiments and should not limit the embodiments. As used herein, the singular forms such as "a," "an" and "the" also include the plural forms, as long as the context does not indicate otherwise. It will be further understood that the terms e.g. "contain", "containing", "comprises," "comprising," "includes" and/or "including," as used herein, specify the presence of the stated features, integers, steps, operations, elements and/or components, but do not preclude the presence or addition of one and/or more other features, integers, steps, operations, elements, components and/or any group thereof.

Figure 1:
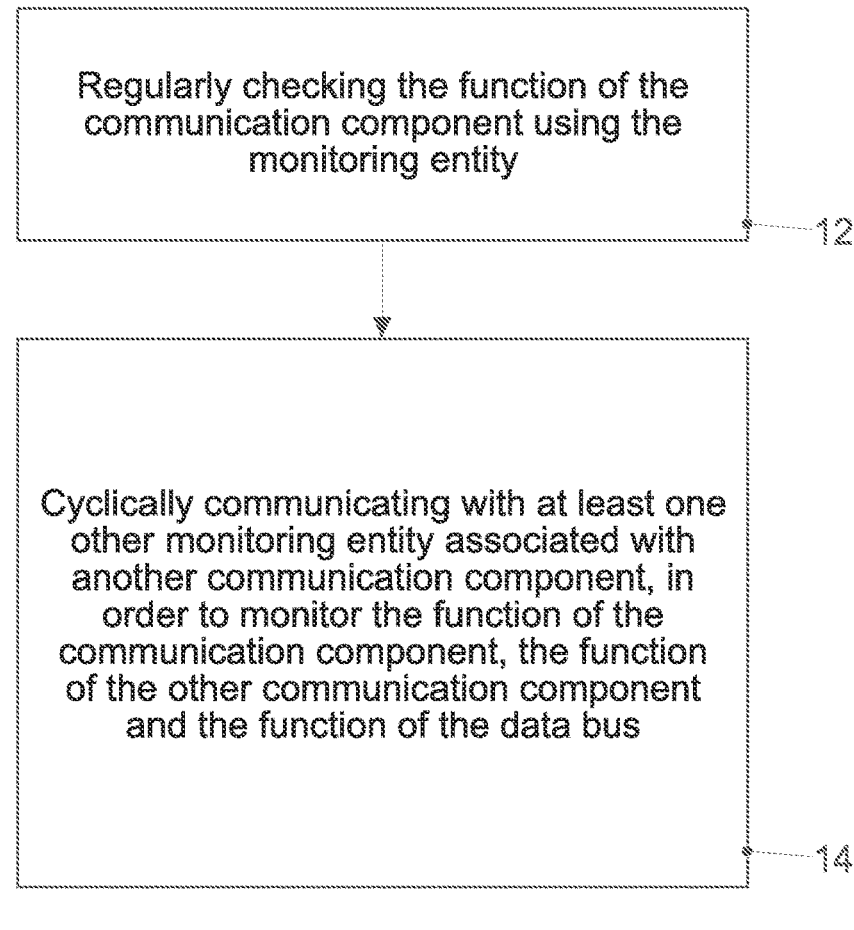
FIG. 1 shows a flowchart of an embodiment of a method for a monitoring entity.
Figure 2:
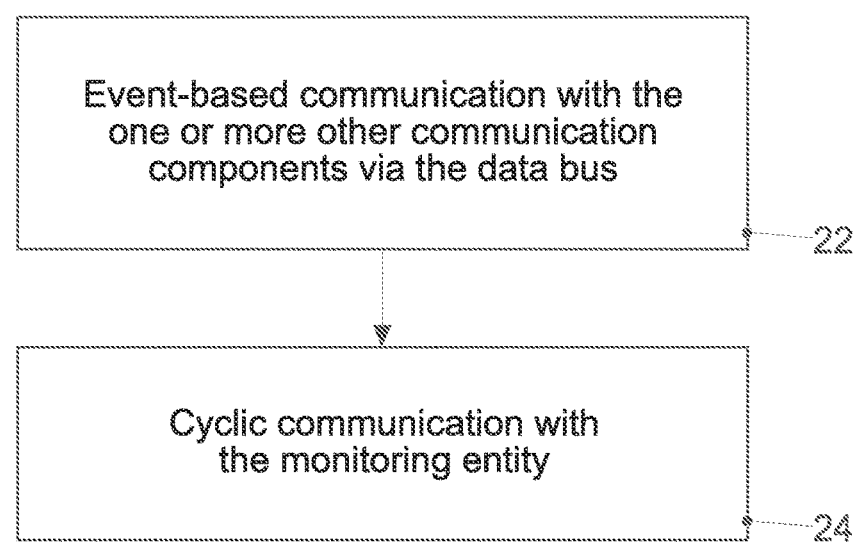
FIG. 2 shows a flowchart of an embodiment of a method for a communication component.
Figure 3:
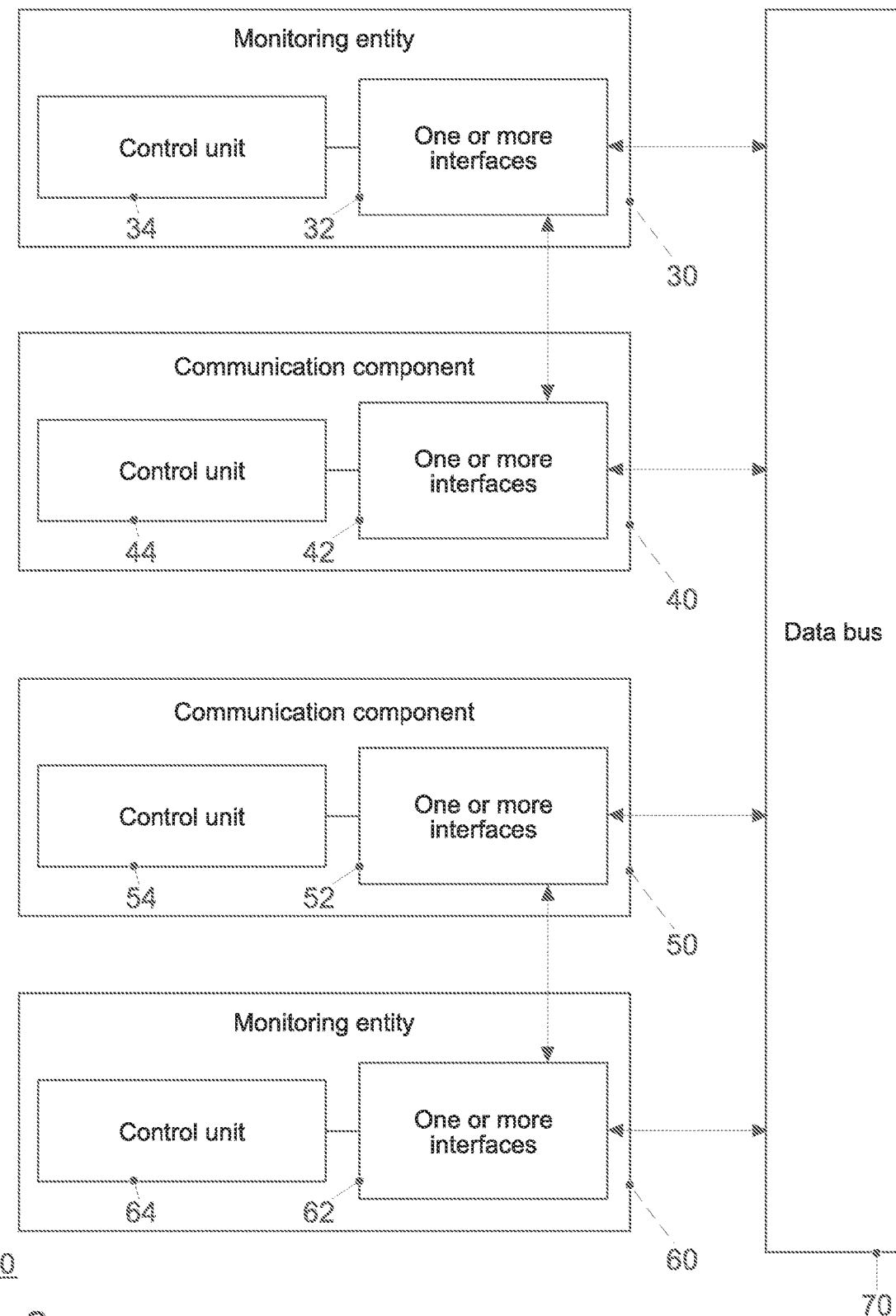
FIG. 3 shows an embodiment of a monitoring entity, an embodiment of a communication component and an embodiment of a system.

FIG. 1 illustrates a flowchart of an embodiment of a method 10 for a monitoring entity 30. FIG. 2 shows an associated flowchart of an embodiment of a method 20 for a communication component 40. FIG. 3 shows an overview of an embodiment of a system 80 with embodiments of monitoring entities 30, 60 and embodiments of communication components 40, 50.

FIG. 1 shows a method 10 for a monitoring entity 30 for monitoring at least one communication component 40. The communication component 40 is configured to communicate with one or more other communication components 50 via a data bus 70 on an event-based basis. The method 10 includes regularly checking 12 the function of the communication component 40 using the monitoring entity 30. The method further includes cyclically communicating 14 with at least one other monitoring entity 60 assigned to another communication component 50 in order to monitor the function of the communication component 30, the function of the other communication component 50 and the function of the data bus 70.

Here and in the following, "regular" is understood to mean a time sequence based on rules. For example, a rule may provide that such communication takes place within a cycle, i.e. within a specified time period. A regular check may therefore be carried out on the basis of a defined time base, a clock or a period, for example every 10 ms, 20 ms, 50 ms, 100 ms, 200 ms, 500 ms, 1 s, 2 s, 5 s, etc. A certain tolerance is to be expected, adapted to the practical conditions, and a (theoretically) perfect period cannot be assumed. In this respect, "regular" communication may also mean "periodic" or "cyclic" communication, in the sense that a maximum time span between two messages is not exceeded according to a specified probability. Cyclic communication may take place according to a guaranteed or at least highly predictable schedule.

Another rule would be linked to an event, so that a malfunction may be detected with a high degree of certainty within a certain time. In this case the event occurs with a sufficiently high probability. Finally, a combination is also conceivable, namely that a check cycle is adapted depending on events. For example, some communication components may then be checked more frequently (so that an error may be detected more quickly) when certain events have occurred. For example, a frost alert may be monitored relatively rarely or not at all at temperatures above 20° C., whereas it is monitored more frequently at low temperatures.

Analogously, FIG. 2 shows a method 20 for a communication component 40 to communicate with one or more other communication components 50 via a data bus 70. The method 20 includes event-based communication 22 with the one or more other communication components 50 via the data bus 70 and cyclic communication 24 with the monitoring entity 30.

In embodiments, the communication components 40, 50 in a communication system 80 may therefore be carried out by monitoring entities 30, 60 associated with the communication components 40, 50. Such systems 80 may, for example, be used in vehicles, e.g. motor vehicles, ships, trains, aircraft, trucks, passenger cars, two-wheelers, etc. Here, for example, controllers communicate with each other, which have been entrusted with different functions. On the one hand, central controllers exist, where information is collected and evaluated, and on the other hand, controllers are used which monitor, control or regulate components such as lighting, indicators, brake lights, sensors, actuators, warning lights, displays, input devices such as buttons or levers, etc. In the following, these controllers are also referred to as communication components which communicate with each other via a data bus 70, as shown in FIG. 3.

FIG. 3 shows a system 80 with two monitoring entities 30, 60 and two communication components 40, 50, which communicate with each other via a data bus 70. In embodiments, the data bus 70 may be the CAN (Controller Area Network) bus or another field bus.

As FIG. 3 shows, the individual components 30, 40, 50, 60 each have one or more interfaces 32, 42, 52, 62 as well as one control unit 34, 44, 54, 64 each, which are further coupled with each other. For example, the one or more interfaces 32, 42, 52, 62 may correspond to one or more inputs or outputs for receiving or providing information or signals, such as in digital bit values, voltages, currents or electromagnetic waves, for example based on a code, within a module, between modules, or between modules of different entities. In this respect, the one or more interfaces 32, 42, 52, 62 are suitable for exchanging signals or information on the data bus 70 or between monitoring entities 30, 60 and communication components 40, 50, i.e. for transmitting and/or receiving. Hereby, further components may exist or be switched between the one or more interfaces 32, 42, 52, 62, examples are amplifiers, filters, diplexers, duplexers, mixers, phase shifters, low noise amplifiers (LNA), plugs, sockets etc.

In embodiments, the control unit 34, 44, 54, 64 may correspond to any controller or processor or to a programmable hardware component. For example, a control unit 34, 44, 54, 64 may also be realized as software which is programmed for a corresponding hardware component. In this respect a control unit 34, 44, 54, 64 may be implemented as programmable hardware with accordingly adapted software. Here, any processors may be used, such as digital signal processors (DSPs). Embodiments are not restricted to a certain type of processor here. Any processors or also several processors or microcontrollers are conceivable for implementing the control module. Implementations in integrated form with other control units are also conceivable, for example in a control unit for a vehicle, which additionally includes one or more other functions. In embodiments, the method steps described herein may be executed by the control units 34, 44, 54, 64 and/or by the respective one or more interfaces 32, 42, 52, 62. In this respect, the described method steps may be carried out by the device components.

With the double-sided arrows, FIG. 3 further illustrates that a corresponding communication between the components or between components and data bus may take place.

In embodiments, a first communication component 40 may be, for example, a controller for a vehicle motion manager (VMM). This controller may offer corresponding client functions. The clients, for example also controllers other than communication component 50, which manage a corresponding interface to the driver, may make requests that may be valid for several seconds (e.g. trajectory) to theoretically minutes or even hours (e.g. target speed). However, if the client function (and/or the communication) fails, a replacement reaction has to take place promptly (less than one second). In this case, this function is performed by monitoring entities 30, 60, which are directly assigned to communication components 40, 50 and monitor them locally, for example via cyclical communication between the monitoring entity 30, 60 and communication component 40, 50 via a connection that differs from the data bus 70.

The monitoring entities 30, 60 may, for example, communicate cyclically with each other via the data bus 70. If the data bus fails, this cyclic communication fails and the malfunction of the data bus 70 may be detected promptly. If one of the communication components 40, 50 malfunctions, this may be detected by the monitoring entities 30, 60 via the local interfaces and communicated with each other via the data bus 70.

In a further embodiment, warning lights (communication component 50) are activated and deactivated by a client function (communications component 40) on an event-based basis, whereby the monitoring entities 30, 60 detect any errors promptly in accordance with the above description.

This may require a reduction of the communication on the data bus, as the cyclic communication may be limited to the monitoring entities 30, 60 and these may also monitor several communication components simultaneously without putting more load on the data bus 70. This may result in a lower message density or message size on the data bus 70 than would be the case if the associated respective client function were to actively suppress a warning lamp (e.g. brake warning lamp), which requires constant individual messages between the respective communication components, and the warning lamp is activated when the client function fails.

FIG. 3 thus shows an embodiment of a monitoring entity 30 for at least one communication component 40, which is configured for communication with one or more other communication components 50 via a data bus 70. The monitoring entity 30 includes one or more interfaces 32 for communication via the data bus 70 and for communication with the communication component 40. The monitoring entity 30 includes a control unit 34, configured to control the one or more interfaces 32 and to communicate cyclically with the communication component 40 and with at least one other monitoring entity 60 of another communication component 50.

As already described above, the control unit 34 of the monitoring entity 30 may be configured to communicate with the communication component 40 via a connection which differs from the data bus 70, for example via a local interface 32. Furthermore, the control unit 34 is configured to transmit an error indication to at least one other monitoring entity 60, when a malfunction or a communication error of the communication component 40 is detected.

In addition, FIG. 3 illustrates an embodiment of a communication component 40 to communicate with one or more other communication components 50 via a data bus 70. The communication component 40 includes one or more interfaces 42 for communication via the data bus 70 and for communication with a monitoring entity 30. The communication component 40 further includes a control unit 44, configured to control the one or more interfaces 42, to communicate with the one or more other communication components 50 in an event-based manner and to communicate cyclically with the monitoring entity 30.

The embodiment of a system 80 in FIG. 3 includes at least two monitoring entities 30, 60 as described above and at least two communication components 40, 50 associated with the monitoring entities 30, 60, as described above. A further embodiment is a vehicle with such a system 80.

Figure 4:
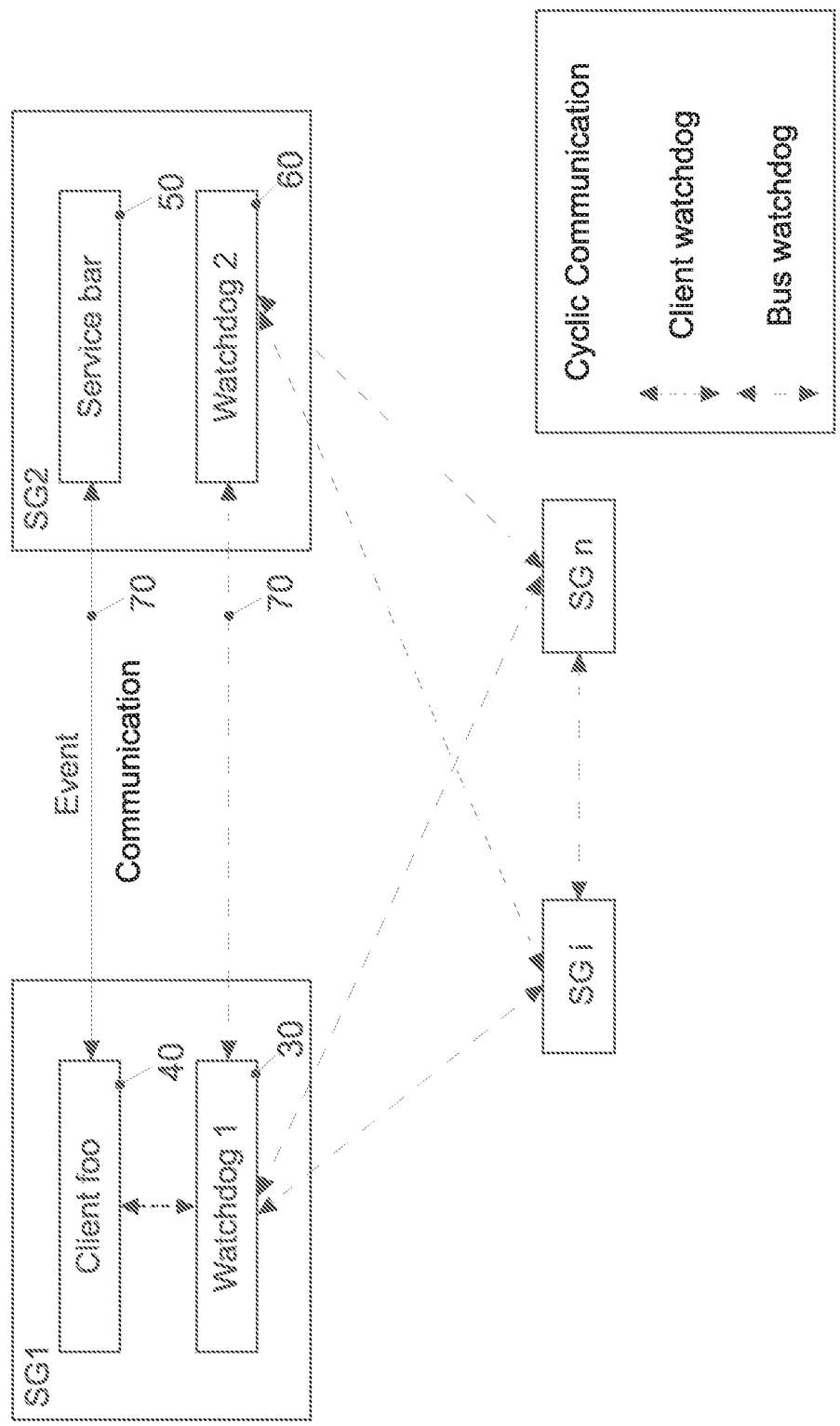
FIG. 4 shows an architecture of a monitoring service in an embodiment.

FIG. 4 shows an architecture of a monitoring service in an embodiment. In the following, the monitoring service will also be called watchdog service, analogously the monitoring entity 30, 60 will also be called watchdog. On the left side, FIG. 4 shows a first controller "SG 1" (from German "Steuergerät 1") on which a client "foo" is implemented as communication component 40, and a "Watchdog 1" is implemented as monitoring entity 30. On the right side, a second controller "SG 2" (from German "Steuergerät 2") is shown, on which a second communication component 50 is implemented as (service) "bar" and a second monitoring entity 60 is implemented as "Watchdog 2". "foo" and "bar" are placeholders for any "clients" and services (services, client functions). As FIG. 4 further shows, a number of other controllers may be present, wherein the monitoring entities 30, 60 communicate cyclically with each other via the dotted arrows. Communication between monitoring entities 30, 60 and the associated communication components 40, 50 takes place locally (double-dotted arrows).

Here, the clients (communication component 40, 50) are monitored cyclically on a local processor, also "localhost" (SG 1, SG2), so that the bus load does not play a role. The monitoring service (watchdog service) for the two communication components 40, 50 is implemented here via the two monitoring entities 30, 60. On each "SG 1, SG 2" involved in event-based communication, a local instance of the watchdog service (method 10, monitoring entities 30, 60) is implemented. The local instances of the watchdog service 30, 60 synchronize themselves via bus 70. A "client", here a communication component 40, 50, may register with the watchdog service 30, 60. In case of a communication error, the watchdog service 30, 60 informs the communication partner of the "client" 40, 50 as a substitute reaction.

Figure 5:
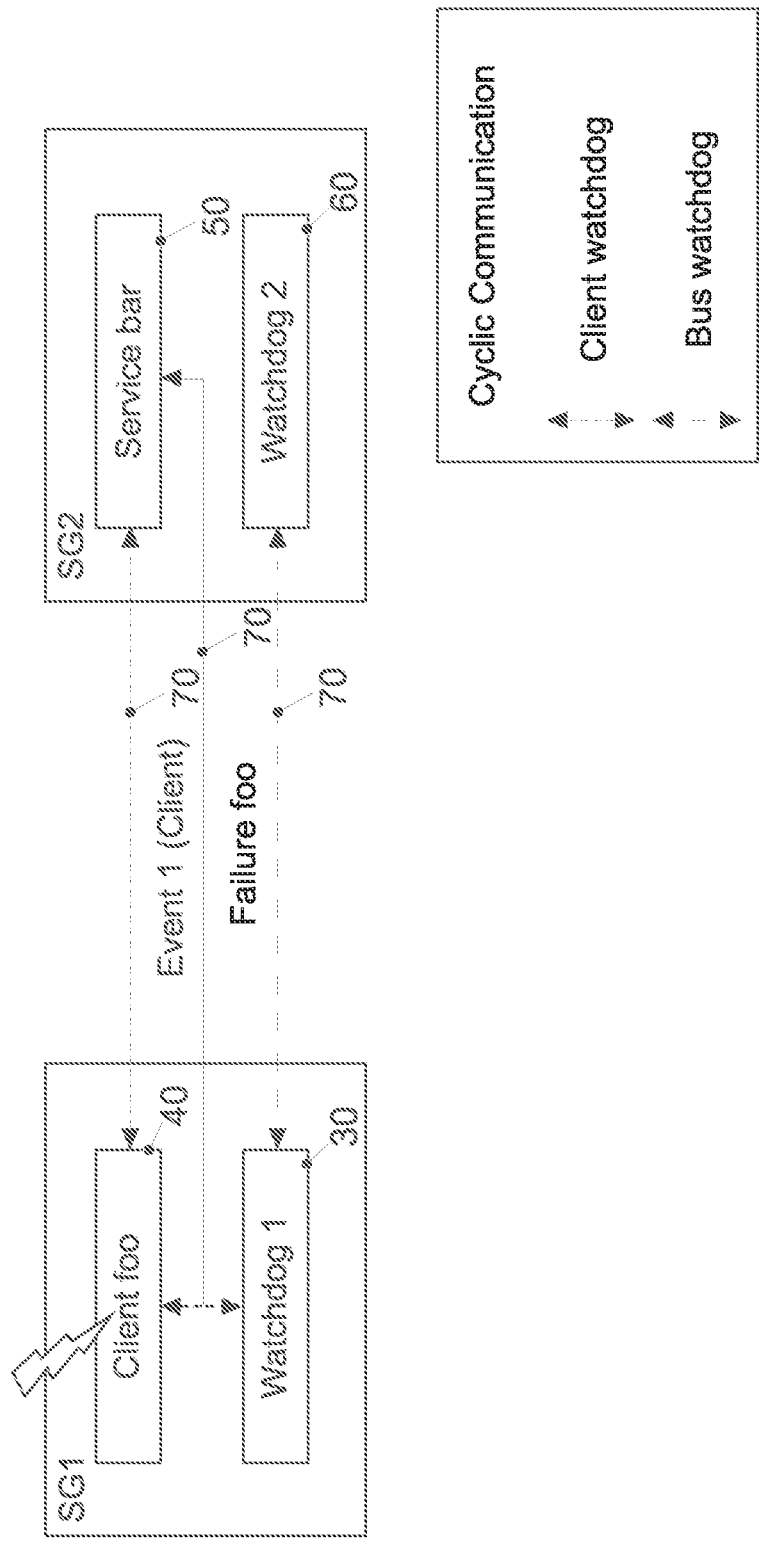
FIG. 5 shows a failure of a communication component in an embodiment.

FIG. 5 illustrates a failure of a communication component 40 in the embodiment, which has been explained using FIG. 4. The client "foo" 40 fails in this embodiment, which is indicated by the lightning bolt. The monitoring entity 30 "Watchdog 1" notices this due to the local cyclic communication with "Client foo", which may also fail, for example, or via which "Client foo" may report an error to the watchdog. "Watchdog 1" 30 may then transmit a corresponding message via the cyclic communication with "Watchdog 2" 60, which may then be passed on to the "Service bar" 50 by "Watchdog 2". In this way, "Watchdog 1" 30 may inform the "Service bar" 50 about the error.

In this embodiment, the method 10 for monitoring entity 30 includes transmitting an error indication to at least the one other monitoring entity 50 when a malfunction or a communication error of the communication component 40 is detected. In further embodiments, a transmission to several further monitoring entities 60 may also take place.

Figure 6:
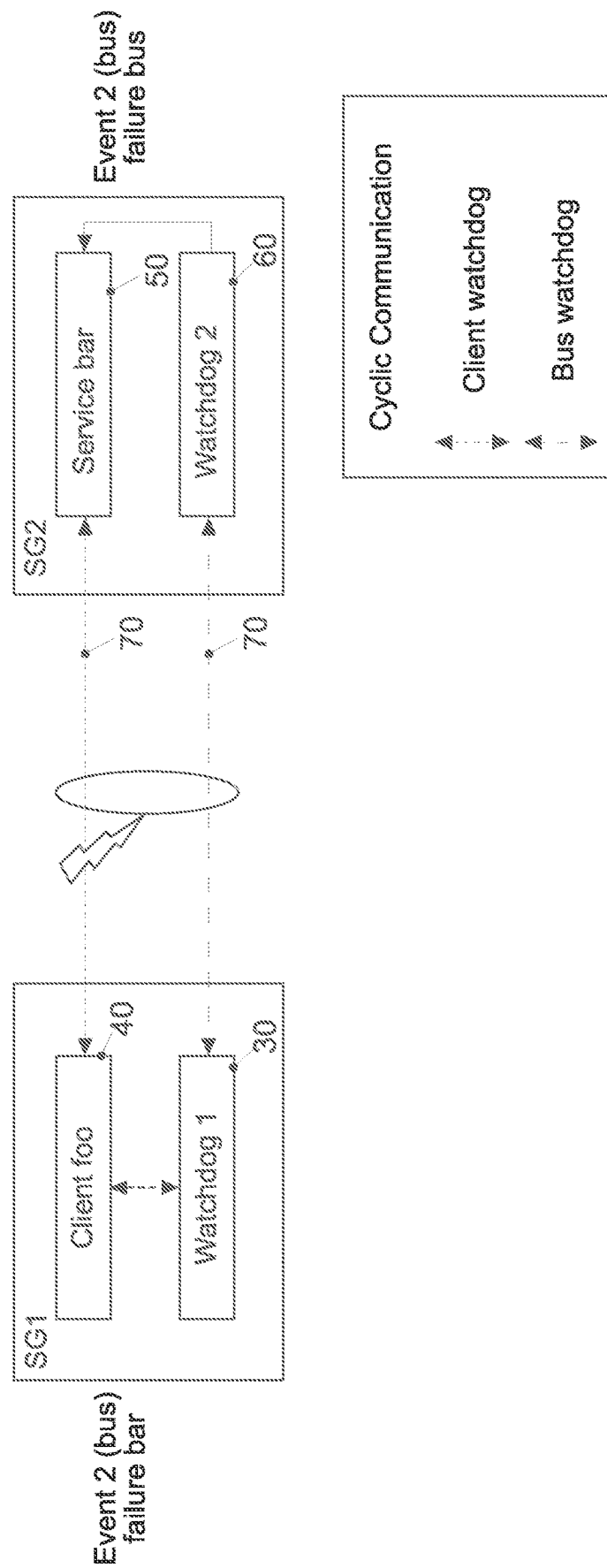
FIG. 6 shows a failure of a data bus in an embodiment.

FIG. 6 shows a failure of a data bus 70 in one embodiment. The scenario already explained using FIGS. 4 and 5 is assumed again. The lightning bolt in FIG. 6 indicates that a fault or failure happens on data bus 70. This also interrupts the cyclic communication between the monitoring entities 30, 60, so that both sides notice the error and may communicate it to their communication components 40, 50. The delay with which such an error may be detected and reported depends on the frequency of the cyclic communication on the data bus 70. In addition, synchronization of the individual monitoring entities 30, 60 may help avoid additional delays. Method 10, which is performed in a monitoring entity 30, 60, may therefore include synchronization with at least one other monitoring entity 60 via data bus 70. If the monitoring entities 30, 60, which are cyclically active on the data bus 70, are synchronized with each other, i.e. have a common time base or clock, the communication on the data bus 70 may run more efficiently and/or the transmission capacities of the data bus may be better utilized.

The control unit 34 of the monitoring entity 30 may be configured appropriately, to synchronize with at least one other monitoring entity 60 and/or vice versa, via the data bus 70.

This may also be done by efficiently managing the capacities of the monitoring entity 30, 60 itself. In order to achieve this, method 10 may provide registration of the communication component 40, 50 with the monitoring entity 30, 60 for the monitoring entity 30, 60. Correspondingly, method 20 for communication component 40, 50 may also provide registration with the monitoring entity 30, 60.

The control unit 34, 64 of the monitoring entity 30, 60 may be configured to perform a registration of a communication component 40, 50. The control unit 44, 54 of the communication component may be configured to perform a registration with the monitoring entity 30, 60.

Figure 7:
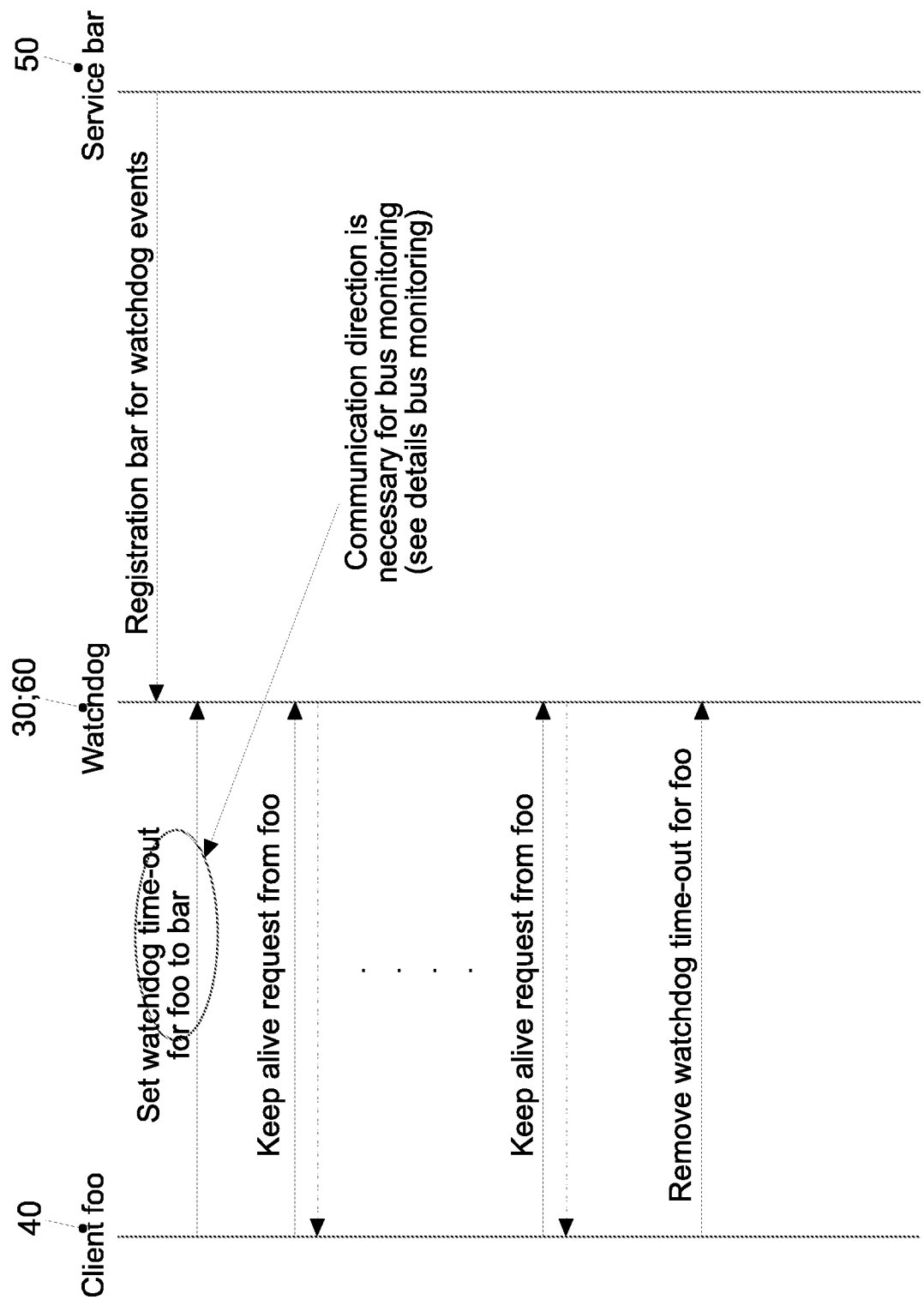
FIG. 7 shows a sequence of exchanged messages in an embodiment.

FIG. 7 shows a sequence of exchanged messages in an embodiment, wherein FIG. 7 shows the normal sequence of the watchdog service, in which no errors occur. On the left side, FIG. 7 shows the "Client foo" 40 as described above. The monitoring service "Watchdog", which is implemented by the monitoring entities 30, 60 described above, is illustrated in the middle. Both communication components 40, 50 register for the watchdog service. In this embodiment, the "Client foo" 40 may request a notification service with a time limit (time-out), whereby the time limit specifies the time after which a message about an error should be distributed at the latest after the error has occurred. Hereby the communication direction is important or necessary for at least some services for bus monitoring, as will be explained in the following. In the embodiment shown, the cyclic communication between the "client foo" 40 and the watchdog service 30, 60 is realized in such a way that the "client foo" makes requests to the watchdog 30 at regular time intervals (also known as "keep alive request"), which are then answered by the watchdog 30. As FIG. 7 shows in the following, the service may also be removed.

Figure 8:
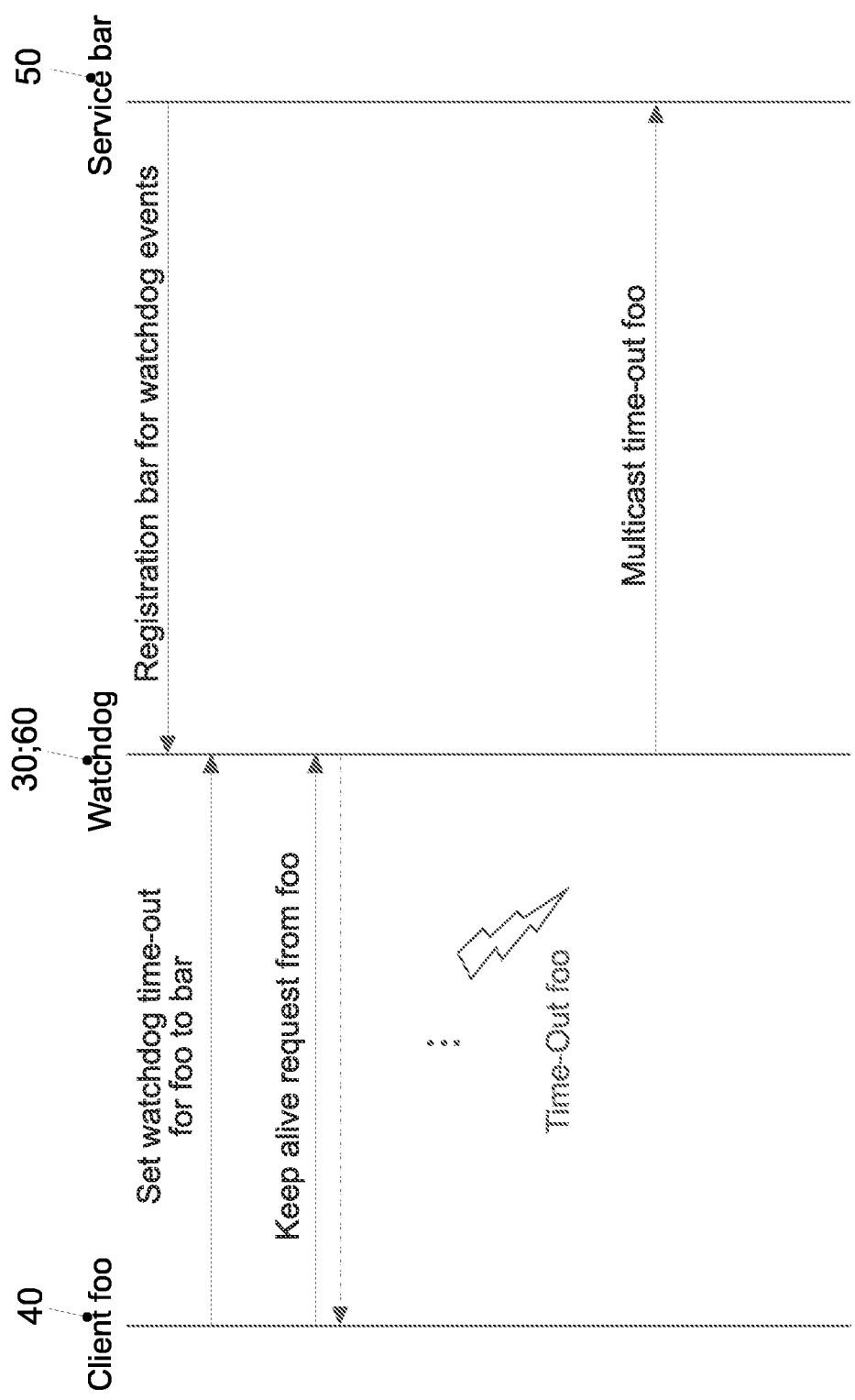
FIG. 8 shows a sequence of exchanged messages in a further embodiment.

FIG. 8 shows a sequence of exchanged messages in a further embodiment. FIG. 8 shows the scenario from FIG. 7 and the exchanged messages at the error pattern according to FIG. 5. Accordingly, the lightning bolt again indicates the error at "Client foo" 40. This error occurs in the scenario already described in FIG. 7, if the "Client foo" 40 does not make a request to the watchdog service within the set time limit. The watchdog service 30, 60 then multicasts a corresponding message "Time-Out foo" ("foo" exceeding the time limit).

Figure 9:
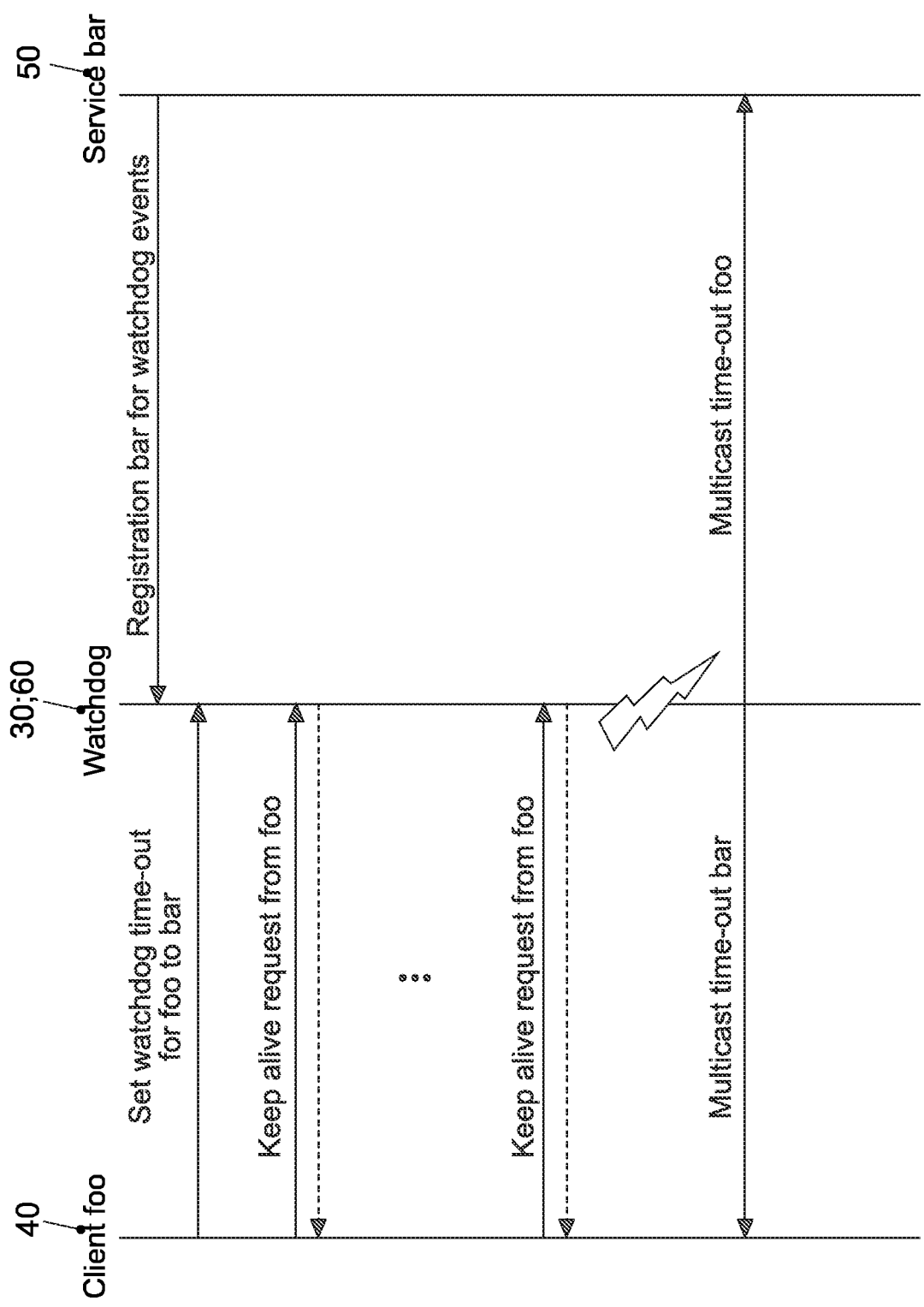
FIG. 9 shows a sequence of exchanged messages in a further embodiment.

In the following embodiment, in case of a bus error, the watchdog service reports with information about which communication connections of the registered clients are affected. In other words, the watchdog service has knowledge about which communication paths the registered clients have with their used services. If then a bus error occurs, the watchdog service may communicate via event on both "sides" of the interruption which communication paths between clients and services have been disrupted. FIG. 9 shows a sequence of exchanged messages in a further embodiment with a data bus error according to FIG. 6. After detection of the error (indicated by the lightning bolt) the watchdog service 30, 60 distributes a corresponding message "Time-Out foo" ("foo" exceeding the time limit) to "Service bar" 50 and a message "Time-Out bar" to "Client foo" 40, following the error.

In embodiments, the methods 10, 20 disclosed herein may be used to monitor communication components 40, 50 and a data bus 70 in a vehicle. Correspondingly, the monitoring entities 30, 60 may be configured to monitor communication components 40, 50 and a data bus 70 in a vehicle. Embodiments may be used in passenger cars, trucks, trains, aircraft or vehicles in general, for example. Embodiments may, for example, use central services/services for monitoring the communication buses on a top communication layer for that purpose.

Further embodiments are computer programs for performing one of the methods described herein, when the computer program is executed on a computer, a processor, or a programmable hardware component. Depending on certain implementation requirements, embodiments of the invention may be implemented in hardware or in software. The implementation may be performed using a digital storage medium, for example a floppy disk, a DVD, a Blu-Ray-Disc, a CD, a ROM, a PROM, an EPROM, an EEPROM or a FLASH memory, a hard disc or another magnetic or optical memory having electronically readable control signals stored thereon, which cooperate or are capable of cooperating with a programmable hardware component in such a way that the respective method is performed.

A programmable hardware component may be formed by a processor, a Central Processing Unit (CPU), a Graphics Processing Unit (GPU), a computer, a computer system, an Application-Specific Integrated Circuit (ASIC), an Integrated Circuit (IC), a System on Chip (SOC), a programmable logics element or a Field Programmable Gate Array (FPGA) comprising a microprocessor.

Therefore, the digital storage medium may be machine or computer readable. Some embodiments include also a data carrier comprising electronically readable control signals which are capable of cooperating with a programmable computer system or a programmable hardware component such that one of the methods described herein is performed. One embodiment is thus a data carrier (or a digital storage medium or a computer-readable medium) on which the program for executing one of the methods described herein is stored.

Generally speaking, embodiments of the present invention may be implemented as a program, firmware, a computer program or a computer program product having a program code or as data, wherein the program code or the data is effective to execute one of the methods when the program is executed on a processor, or a programmable hardware component. The program code or the data may, for example, also be stored on a machine-readable carrier or data carrier. The program code or the data may, among others, be present as a source code, machine code or byte code or any other intermediate code.

The embodiments described above are merely an illustration of the principles of the present invention. It is understood that modifications and variations of the arrangements and the details described herein will be apparent to others skilled in the art. Therefore, it is intended that the invention is limited only by the scope of protection of the claims below and not by the specific details presented in the description and explanation of the embodiments herein.

LIST OF REFERENCE NUMBERS

10 Method for monitoring entity
12 regular check
14, 24 cyclic communication
20 Method for communication component
22 event-based communication
30, 60 monitoring entity
32, 42, 52, 62 one or more interfaces
34, 44, 54, 64 control unit
40, 50 communication component
70 data bus
80 system

The invention claimed is:

1. A method for a monitoring entity for monitoring at least one communication component of a plurality of communication components, wherein each communication component of the plurality of communication components is configured to communicate in an event-based manner via a connection to a data bus with one or more other communication components of the plurality of communication components, comprising the following steps:
cyclically communicating via a local connection with the at least one communication component, wherein:
the local connection differs from the data bus, and the cyclic communication via the local connection regularly checks functionality of the communication component; and cyclically communicating via the data bus with at least one other monitoring entity, wherein:

the at least one other monitoring entity is associated with another communication component of the plurality of communication components, and the cyclic communication via the data bus:

reports functionality of the communication component, monitors functionality of the other communication component, and monitors functionality of the data bus.

2. The method of claim 1, further comprising receiving an error indication from the at least one other monitoring entity when a malfunction or a communication error of the other communication component is detected.

3. The method of claim 1, further comprising transmitting an error indication to at least one other monitoring entity when a malfunction or a communication error of the communication component is detected.

4. The method of claim 1, further comprising synchronizing with at least one other monitoring entity via the data bus.

5. The method of claim 1, further comprising registering the communication component with the monitoring entity.

6. The method of claim 1 for monitoring communication components and a data bus in a vehicle.

7. A method for a communication component to communicate with one or more other communication components, using event-based communication via a data bus with the one or more other communication components; and cyclic communication via a local connection which differs from the data bus with a monitoring entity operable according to the method of claim 1.

8. The method of claim 7, further comprising registering with the monitoring entity.

9. A non-transitory, computer-readable medium comprising a program code for performing the method of claim 1, when the program code is executed on a computer, a processor, or a programmable hardware component.

10. A monitoring entity for at least one communication component of a plurality of communication components, wherein each communication component of the plurality of communication components is configured for communication in an event-based manner via a connection to a data bus with one or more other communication components of the plurality of communication components, the monitoring entity comprising:

one or more interfaces for communication with:

at least one other monitoring entity via the data bus, wherein the at least one other monitoring entity is associated with another communication component of the plurality of communication components, and the at least one communication component via a local connection which differs from the data bus; and a control unit configured to control the one or more interfaces and to:

cyclically communicate via the local connection with the at least one communication component, wherein the cyclic communication via the local connection regularly checks functionality of the communication component, and cyclically communicate via the data bus with the at least one other monitoring entity, wherein the cyclic communication via the data bus:

reports functionality of the communication component, monitors functionality of the other communication component, and monitors functionality of the data bus.

11. The monitoring entity of claim 10, wherein the control unit is configured to transmit an error indication to at least one other monitoring entity when a malfunction or a communication error of the communication component is detected.

12. The monitoring entity of claim 10, wherein the control unit is configured to synchronize with at least one other monitoring entity via the data bus.

13. The monitoring entity of claim 10, wherein the control unit is configured to perform a registration of a communication component.

14. The monitoring entity of claim 10, which is configured to monitor communication components and a data bus in a vehicle.

15. A communication component for communication with one or more other communication components, with one or more interfaces for communication via a data bus and for communication with a monitoring entity via a local connection which differs from the data bus;

a control unit, configured to control the one or more interfaces, to communicate in an event-based manner via the data bus with the one or more other communication components and to communicate cyclically via the local connection with the monitoring entity of claim 10.

16. The communication component of claim 15, wherein the control unit is configured to perform a registration with the monitoring entity.

17. A system with at least two monitoring entities according to claim 10 and at least two communication components connected via a data bus, each communication component comprising:

one or more interfaces for communication via the data bus and for communication with a monitoring entity of the at least two monitoring entities via a local connection which differs from the data bus;

a control unit, configured to control the one or more interfaces, to:

communicate with the one or more other communication components of the at least two communication components in an event-based manner, and communicate cyclically via the local connection with the monitoring entity.

18. A vehicle with a system according to claim 17.

* * * * *